United States Patent [19] [11] 4,054,427
Schroeter et al. [45] Oct. 18, 1977

[54] METHOD OF RECOVERING KRYPTON AND XENON NUCLIDES FROM WASTE GASES

[75] Inventors: Hans-Juergen Schroeter; Karl Knoblauch; Harald Juentgen; Peter Kronauer, all of Essen, Germany

[73] Assignee: Bergwerksverband GmbH, Essen, Germany

[21] Appl. No.: 536,594

[22] Filed: Dec. 26, 1974

Related U.S. Application Data

[63] Continuation of Ser. No. 338,397, May 5, 1973, abandoned.

[30] Foreign Application Priority Data

Mar. 3, 1972 Germany .......................... 2210264

[51] Int. Cl.$^2$ .............................................. B01D 53/02
[52] U.S. Cl. ........................................ 55/25; 55/58; 55/66
[58] Field of Search ............... 55/28, 62, 66, 74, 179, 55/25, 26

[56] References Cited

U.S. PATENT DOCUMENTS

| | | | |
|---|---|---|---|
| 3,063,217 | 11/1962 | Armond et al. | 55/66 X |
| 3,085,379 | 4/1963 | Kiyonaga et al. | 55/62 X |
| 3,680,288 | 8/1972 | Eluard | 55/62 X |
| 3,703,797 | 11/1972 | Lepold et al. | 55/62 |
| 3,797,201 | 3/1974 | Tamura | 55/62 |
| 3,923,477 | 12/1975 | Armond et al. | 55/25 |

OTHER PUBLICATIONS

Cryogenic Rare Gas Recovery in Nuclear Fuel Reprocessing, Chem. Engr., vol. 78, No. 22, pp. 55-57.

Primary Examiner—Thomas G. Wyse
Assistant Examiner—Ferris H. Lander
Attorney, Agent, or Firm—Michael J. Striker

[57] ABSTRACT

A method of recovering krypton and xenon nuclides from waste gases of nuclear power plants which comprises conveying a stream of waste gas at atmospheric pressure through a bed of activated carbon in an adsorber until the nuclides begin to issue at the outlet of the adsorber. The bed is thereupon regenerated by reducing the pressure therein to 10–300 torr to obtain a desorption gas which can be admixed to waste gas by rinsing the bed with a fluid (preferably an inert gas) at a pressure of 10–400 torr to obtain a stream of product gas which contains a high concentration of nuclides, and by thereupon raising the pressure in the adsorber with an inert gas back to atmospheric pressure.

18 Claims, 2 Drawing Figures

METHOD OF RECOVERING KRYPTON AND XENON NUCLIDES FROM WASTE GASES

CROSS-REFERENCE TO RELATED APPLICATION

This application is a continuation of our application Ser. No. 338,397, filed Mar. 5, 1973, now abandoned.

BACKGROUND OF THE INVENTION

The present invention relates to a method of recovering krypton and/or xenon nuclides from waste gases. More particularly, the invention relates to improvements in a method of recovering krypton and/or xenon nuclides which includes adsorption of nuclides in activated carbon or another suitable adsorbent and their desorption from the adsorbent.

Waste gases produced in nuclear power plants and other fuel plants contain krypton and/or xenon nuclides which, as a rule, are radioactive and therefore should not be permitted to escape into the atmosphere. Krypton-85 is particularly dangerous since its radioactivity declines very slowly (half-life period about 10.7 years). Therefore, the contaminated waste gas (normally air) is relieved of solid vaporized fission products, water vapor, hydrogen and oxygen in a first step, and is thereupon caused to contact activated carbon or another suitable adsorbent at extremely low temperatures, preferably in the range of between $-70°$ and $-196°$ C. The activated carbon is thereupon subjected to a desorption treatment at elevated temperatures which yields a product gas containing higher concentrations of noble gases. The enrichment factor in an adsorber which contains activated carbon at a temperature of $-40°$ C is about five. The enrichment factor is the ratio of noble gas concentration in product gas to noble gas concentration in untreated waste gas. Higher concentrations of noble gas can be achieved by arranging several enriching stages in series. The just described conventional adsorption method is quite expensive, mainly because the adsorbing vessel or vessels must be maintained at an extremely low temperature. On the other hand, the concentration of noble gases in the product gas is very unsatisfactory if the adsorption takes place without cooling of the bed of adsorbent in the vessel.

SUMMARY OF THE INVENTION

An object of the invention is to provide a novel and improved method of economically recovering krypton and/or xenon nuclides from waste gases without cooling of the adsorbent.

Another object of the invention is to provide a simple and inexpensive method of the just outlined character according to which the enrichment factor is at least as high as and normally higher than that which can be achieved in accordance with the presently known methods but the outlay for the adsorbing vessels or towers (hereinafter called adsorbers) is much lower than in conventional apparatus.

An additional object of the invention is to provide a novel and improved method of recovering krypton and/or xenon nuclides from activated carbon or another suitable adsorbent.

Still another object of the invention is to provide a novel and improved method of separately recovering krypton and xenon nuclides from waste gases of nuclear power plants or the like.

A further object of the invention is to provide a novel and improved method of regenerating activated carbon or another suitable adsorbent in apparatus for recovering krypton and/or xenon nuclides from waste gases.

The method of the present invention is resorted to for the segregation and recovery of krypton and/or xenon nuclides from waste gases and comprises the steps of conveying a stream of waste gas which contains krypton and/or xenon nuclides at a predetermined pressure (e.g., at atmospheric pressure) through at least one adsorber which contains a bed or column of activated carbon or another suitable adsorbent whereby the adsorbent adsorbs the nuclides, interrupting the conveying step in response to detection of escape of nuclides from the adsorber, and regenerating the bed of adsorbent in the following way:

a. evacuating the bed so that the pressure therein decreases to 10–300 torr (preferably 20–120 torr), b. collecting the thus obtained desorption gas (e.g. for reintroduction into the adsorber when the admission of waste gas is restarted), c. rinsing or flushing the bed with an inert fluid (e.g. $CO_2$ gas) at a pressure of 10–400 torr (preferably 30–150 torr) to thus obtain a product fluid which is enriched with nuclides, and d. raising the pressure in the bed to the predetermined pressure by introducing into the bed an inert gas (preferably that inert gas which constitutes the main ingredient of waste gas, normally air).

The inert rinsing fluid and/or the inert pressure raising gas may be conveyed through the adsorber concurrent with or countercurrent to the direction of flow of waste gas through the adsorber. The composition of the desorption gas is more satisfactory for reintroduction into the waste gas if the evacuation takes place countercurrent to the direction in which a stream of fresh waste gas is being conveyed through the adsorber. The inert gas which is used to raise the pressure of adsorbent can be aspirated by the bed or it may be forcibly fed into the adsorber.

The method of the present invention is based on the surprising discovery that noble gases which are adsorbed in the adsorber cannot be recovered by simple evacuation alone but rather in a series of steps including vacuum desorption followed by rinsing or cleansing with an inert fluid which renders it possible to obtain a product fluid with a high concentration of noble gases. As mentioned before, the evacuating step of the regenerating operation includes desorption of a gas whose composition is identical with or approximates that of waste gas. This is desirable because the desorption gas which is obtained in the evacuating step can be stored in an intermediate receptacle and reintroduced into the untreated waste gas for admission into the adsorber without in any way affecting the efficiency or other desirable characteristics of the apparatus.

It is further contemplated to carry out the adsorption step at elevated pressures and/or lower temperatures. This is often desirable because the adsorptivity of activated carbon or other adsorbents increases with increasing pressure of admitted waste gas and with decreasing temperature of such gas.

The treatment of waste gas need not be interrupted during regeneration of adsorbent. For example, the adsorber can be connected in parallel with one or more additional adsorbers which receive waste gas during regeneration of activated carbon in the first adsorber, and vice versa. As a rule, the total number of adsorbers need not exceed two or three and depends on the length of time which is required for complete regeneration of adsorbent.

The exact manner in which the escape of krypton and/or xenon nuclides is detected at the outlet of an adsorber forms no part of the present invention. Many methods of detecting radioactive noble gases are well known in the art of recovering xenon and/or krypton from waste products of nuclear power plants or the like. The escape of noble gases from an adsorber is assumed to take place when the concentration of such gases in the gas issuing from the adsorber exceeds a permissible value, i.e., a value which is low enough to allow the escape of treated waste gases into the atmosphere. This value depends on the laws of particular countries; for example, the permissible percentage of krypton-85 in atmospheric air in accordance with the laws of Western Germany is $3 \times 10^{-6}$ microcurie per milliliter.

As mentioned above, the art of recovering radioactive krypton and xenon gases from waste gases which are obtained in nuclear power plants or the like suggests many convenient procedures for measurement of the concentration of such gases in a stream of waste gases so that the termination of adsorption in the adsorber or adsorbers presents no problems. The detector or detectors can serve to automatically initiate the regeneration of adsorbent as soon as the concentration of radioactive gases in the stream of waste gases which issue from the adsorber reaches a predetermined maximum permissible value. Nevertheless, it is also contemplated to terminate the admission of waste gases into a given adsorber after a preselected interval of time which is determined empirically so that the entire operation can be regulated by extremely simple control elements in the form of time-delay relays or the like which interrupt the admission of waste gases into an adsorber, start the steps of the regenerating operation in a given sequence and carry out such steps for predetermined intervals of time, and thereupon initiate renewed admission of waste gases into the bed of regenerated adsorbent.

The adsorber or adsorbers can be filled with any known type of activated carbon as well as with other adsorbents exhibiting identical or similar (equally satisfactory) adsorption characteristics.

The volume of gases which are evacuated from the adsorbent in the first step of the regenerating operation is very high; depending on the final evacuating pressure, the thus recovered gas may constitute 75-95 percent of the total quantity of adsorbed gas which has accumulated in the interstices of the adsorbent bed. This will explain the importance of introduction of such gases into freshly admitted waste gases.

The quantities of inert rinsing fluid are preferably low in order to increase the concentration of noble gases in the product gas. It was found that, by utilizing small quantities of rinsing or cleansing fluid, one can achieve an enrichment factor of 3 for krypton and/or xenon even if the adsorption takes place at normal temperatures and with no changes in temperature between adsorption and desorption. In addition to $CO_2$ gas, the inert rinsing medium can be any other fluid which does not attack the adsorbent and can be discharged into the atmosphere. Such media include helium, nitrogen and air. As mentioned above, the desorption can be accelerated and the enrichment factor raised if the rinsing or cleansing of adsorbent with an inert fluid takes place at an elevated temperature. Heated air has been found to be particularly suited for such treatment.

Though the rinsing step can be effected by conveying the inert fluid concurrent with the stream of waste gas, it is normally preferred to convey the inert fluid counter to the direction of waste gas flow in the adsorber because this renders it possible to bring about a highly satisfactory and practically complete rinsing of noble gas nuclides with relatively small quantities of inert fluid. It is also within the purview of the invention to convey the inert gas transversely across the bed of adsorbent, i.e., substantially at right angles to the direction of waste gas flow. Such mode of desorption is less desirable at this time because the apparatus which is used for carrying out the improved method must be provided with one or more specially designed adsorbers which permit the flow of an inert fluid transversely across the bed of adsorbent. The desorption yields a gaseous product which at the outset contains relatively high concentrations of krypton and xenon (first stage) and thereupon contains only xenon.

In accordance with a further feature of the improved method, one can obtain higher concentrations of krypton and xenon (e.g., an enrichment factor above 4 at normal temperatures) if the rinsing step of the regeneration operation is subdivided into several stages the first of which includes rinsing the adsorbent countercurrent to the direction of waste gas flow to thus obtain a first fraction of product fluid which is enriched with krypton and xenon. This first stage is followed by a second stage which begins as soon as the concentration of krypton and/or xenon in the product fluid is reduced to the average concentration in fresh waste gas and includes withdrawing a second fraction which can be fed into the body of untreated (fresh) waste gas.

The rinsing fluid may be one of the aforementioned inert gases as well as untreated waste gas and/or desorption fluid which is withdrawn from the adsorbent in the course of the evacuating step. The second stage of the rinsing step preferably includes treatment with an inert gas in order to insure complete desorption of all noble gas nuclides.

The duration of the rinsing step is preferably as short as possible because this contributes to higher enrichment factors. On the other hand, it is desirable to terminate the rinsing step upon complete evacuation of all traces of krypton and/or xenon from the absorbent. As a rule, the interval of rinsing need not exceed 15-60 minutes per adsorber. If the rinsing step is carried out in two stages, each of these stages normally takes up one-half of the total time which is allotted for evacuation of noble gases from the absorbent. The optimum times for rinsing in a single stage or in several stages can be determined by resorting to simple experimentation.

The improved method can be utilized for separate recovery of krypton and xenon if the rinsing fluid is conveyed concurrent with waste gases. It was found that such mode of rinsing results in desorption of krypton during the first stage and in desorption of xenon during the second stage of rinsing. This renders it possible to recover xenon (whose radioactivity declines more rapidly than that of krypton) for utilization in many branches of the industry. On the other hand, krypton is normally concentrated in several additional enriching stages and must be stored for many years in a manner to positively prevent radiation. The just described rinsing step preferably employs an inert gas which renders it possible to obtain first and second fractions which are respectively free of krypton and xenon.

A drawback of the just discussed method of separately recovering krypton and xenon is that, when the bed of adsorbent is rinsed with an inert gas which flows concurrent with the waste gas, the desorption of krypton is not immediately followed by desorption of xenon so that the regeneration of adsorbent may take several hours. This can be avoided if the adsorption of noble gases takes place in two serially arranged adsorbers the first of which discharges waste gas that is thereupon admitted into and conveyed through the second adsorber. The volumes of the two adsorbers are selected in such a way that the outlet of the first adsorber still does not discharge any xenon when the outlet of the second adsorber discharges krypton. The second step (rinsing) of the regenerating operation is then carried out by resorting to an inert fluid which flows concurrent with waste gas. The rinsing of both adsorbers takes place simultaneously until complete desorption of krypton but prior to the start of transfer of xenon from the first into the second adsorber. From then on, the two adsorbers are rinsed separately whereby one adsorber yields only krypton and the other adsorber yields only xenon.

It will be noted that one can operate with two adsorbers of different dimensions which are disposed one behind the other, as considered in the direction of flow of waste gas therethrough, and that the volumes of the two adsorbers are related to each other in such a way that no breakthrough of xenon will be observed at the outlet of the first (normally smaller) adsorber at the time when the second (normally larger) adsorber begins to discharge krypton. The ratio of the volumes of the two adsorbers depends on the pressure, temperature and throughput of waste gas during adsorption and is normally between 1:10 and 1:25. The regeneration of adsorbent in the two adsorbers is thereupon carried out as follows:

During the evacuating step, the two adsorbers are evacuated simultaneously and the direction of flow is optional. If the gas which is being withdrawn in the course of the evacuating step is to be introduced into untreated waste gas, the evacuation preferably takes place countercurrent to the direction of waste gas flow.

The rinsing or cleansing step of the regenerating operation is carried out by conveying an inert fluid in the direction of waste gas flow during adsorption. Both adsorbers are rinsed simultaneously in order to effect complete expulsion of krypton from the first adsorber but such rinsing is terminated before the first adsorber begins to discharge xenon into the second adsorber. From there on, the rinsing of both adsorbers takes place separately. This insures that the product gas which is being obtained from the first adsorber contains only enriched xenon and the outlet of the second adsorber discharges product gas which contains only enriched krypton.

The intervals for rinsing of both adsorbers are normally of identical length. As a rule, the length of such intervals is less than 60 minutes. The enrichment factor for krypton is normally different from that for xenon. If the rinsing fluid is air and the rinsing takes place at normal temperatures, the enrichment factor for krypton is about 3. The enrichment factor for xenon is 20 or more.

Whenever the rinsing step furnishes a product gas, it is desirable to use a readily condensable rinsing fluid, such as steam, $CO_2$, ammonia or a freon. This renders it possible to segregate the rinsing fluid from product gas by freezing or condensation and to raise the enrichment factor to 15 or higher even if the adsorption and desorption take place at normal temperatures. If the rinsing fluid is water vapor at elevated temperature, the adsorbent (normally activated carbon) is subjected to a moistening or wetting action with the result that, on prolonged operation of the apparatus, the enrichment factor gradually decreases. In such apparatus, the activated carbon is preferably heated with air at regular intervals to expel moisture therefrom.

If the rinsing step is carried out in two stages, a condensible rinsing fluid is normally used only for the first rinsing stage. The rinsing gas which is used in the second stage is preferably identical with the main constituent of the waste gas (normally air) so that, and as already explained above, the desorption gas which is obtained during the second rinsing stage can be mixed with untreated waste gas.

The utilization of condensible rinsing fluids in the cleansing step of the regenerating operation is of particular importance and will be discussed in greater detail hereinafter.

Regardless of the nature of the rinsing or cleansing step, the adsorbent is thereupon subjected to a treatment with inert gas which results in raising of pressure in the adsorber to normal adsorption pressure. The inert gas can be aspirated by or forcibly introduced into the adsorbent. Such inert gas is preferably air which is normally the main constituent of waste gases.

The novel features which are considered as characteristic of the invention are set forth in particular in the appended claims. The segregating and recovering apparatus itself, however, both as to its construction and its mode of operation, together with additional features and advantages of the method, will be best understood upon perusal of the following detailed description of certain specific embodiments with reference to the accompanying drawing.

DESCRIPTION OF THE PREFERRED EMBODIMENTS

Figure 1:
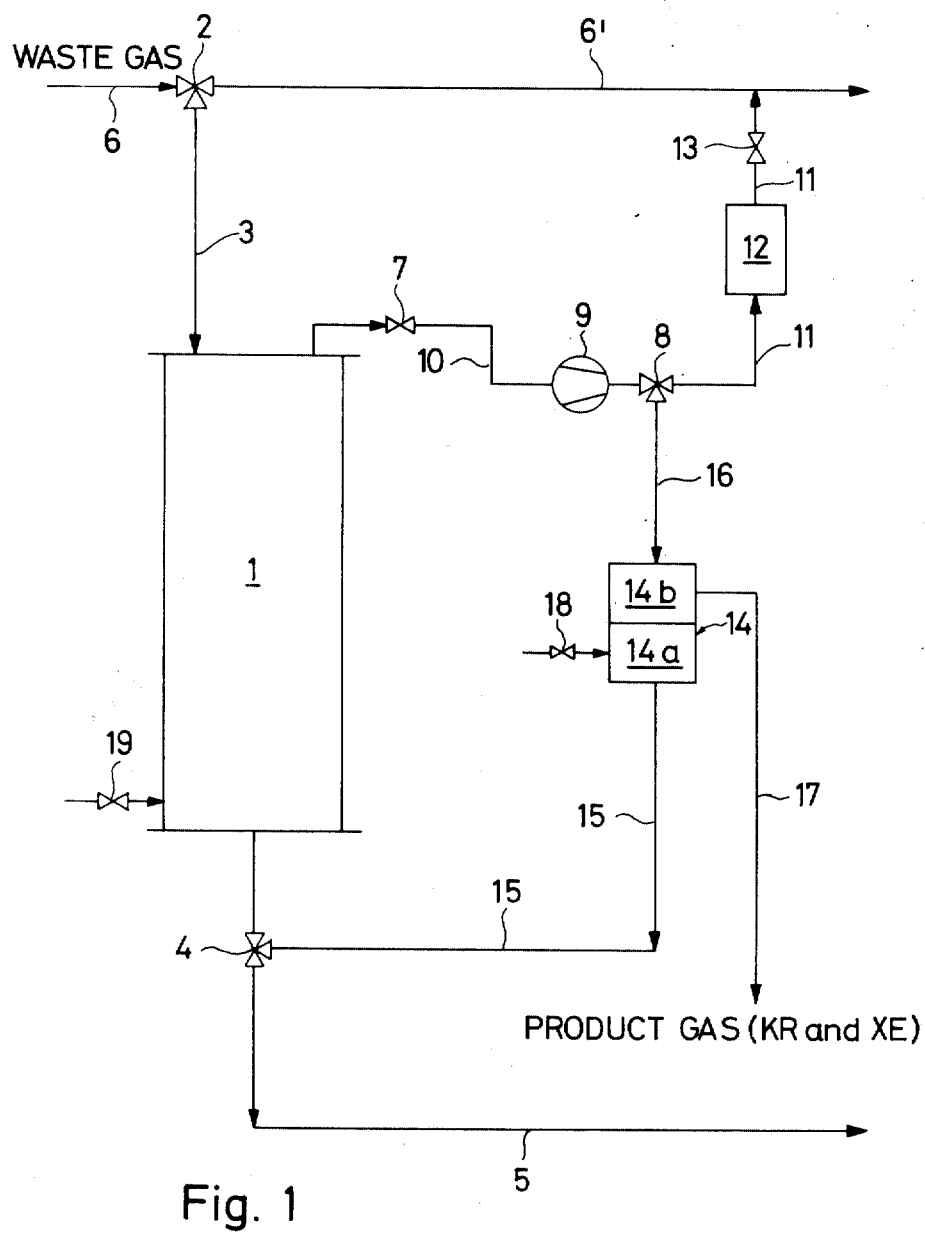
FIG. 1 is a diagrammatic view of a segregating and recovering apparatus which embodies one form of the invention.

The apparatus of FIG. 1 comprises an adsorption vessel or tower 1 (hereinafter called adsorber) which is filled with activated carbon and receives waste gas containing xenon and krypton by way of a supply conduit 6, a valve 2 and a further conduit 3. The valve 2 can be set to admit waste gas from the conduit 6 to the conduit 3, to admit waste gas from the conduit 6 to a conduit 6' which delivers waste gas to a second adsorber, not shown, or to seal the conduit 6 from the conduits 3 and 6'. The conduit 6 is provided to supply waste gas at a predetermined pressure (e.g., at normal atmospheric pressure) and the valve 2 continues to feed waste gas to the conduit 3 until such time when the outlet of the adsorber 1 begins to discharge krypton. The breakthrough of xenon would normally take place much later following the breakthrough and escape of krypton. The gas which leaves the adsorber 1 by way of a valve 4 prior to breakthrough of krypton is practically free of excessive concentrations of krypton and xenon and, therefore, such gas can be discharged directly into the atmosphere by way of a discharge conduit 5.

When the outlet of the adsorber 1 begins to discharge krypton, the setting of the valve 2 is changed so that the waste gas supplied by the conduit 6 is fed into the conduit 6' for admission into one or more additional adsorbers which are connected in parallel with the adsorber 1. The activated carbon in the adsorber 1 is thereupon regenerated in the following way:

The valve 4 is closed and a valve 7 is opened together with a further valve 8 so that a pump 9 can reduce the pressure in the adsorber 1 to 10–300 torr. The thus evacuated gas, whose krypton and xenon concentration corresponds on the average to that of krypton and xenon in waste gas flowing in the supply conduit 6, is fed into the conduit 6' by way of a conduit 11 containing an intermediate receptacle 12 and a further valve 13. In the next step, the valves 4 and 8 are adjusted in such a way that the pump 9 causes a cleansing or rinsing gas (e.g., $CO_2$ gas) to flow into the adsorber 1 by way of a conduit 15 and valve 4. The cleansing gas develops in the evaporator 14a of a combined evaporating and condensing aggregate 14, and is supplied into the adsorber 1 from below at a pressure of 10–400 torr. The cleansing gas desorbs krypton and xenon from the bed of activated carbon in the adsorber 1 and introduces such gases into the condenser 14b of the aggregate 14 by way of conduits 10 and 16. The cleansing gas is frozen out of the product gas (krypton and xenon) in the condenser 14b, and the product gas is evacuated from the condenser 14b by way of a conduit 17. A valve 18 is provided to supply additional cleansing gas into the evaporator 14a when necessary.

Upon completion of the cleansing operation, a valve 19 admits an inert gas into the adsorber 1 so that the pressure in the adsorber rises to its original value (e.g., atmospheric pressure). The inert gas is preferably a gas which is identical with the main constituent of waste gas in the supply conduit 6 (e.g., air). This completes the regeneration of activated carbon in the adsorber 1 which is then ready for operation on the recovery line, i.e., to remove krypton and xenon from waste gas which is admitted from conduit 6 into the conduit 13 in response to appropriate adjustment of the valve 2.

Figure 2:
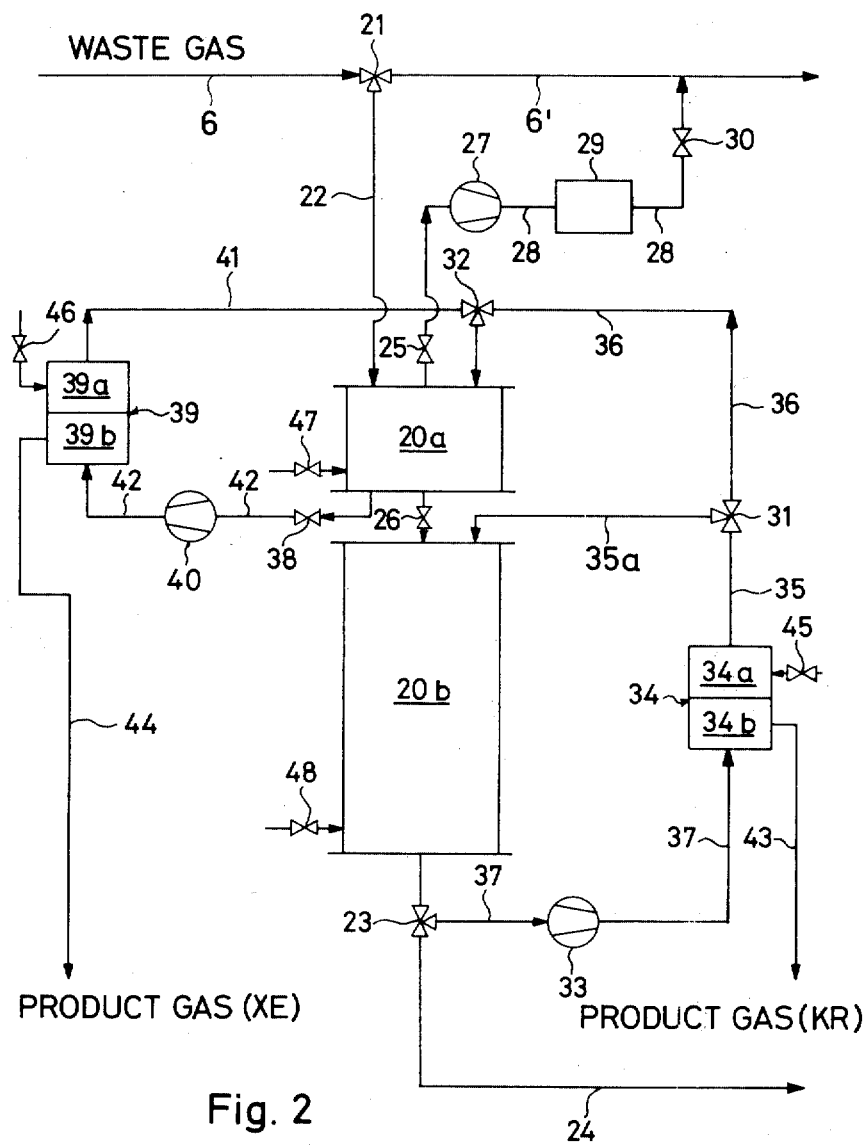
FIG. 2 is a similar diagrammatic view of a second apparatus.

FIG. 2 illustrates a second apparatus having two discrete adsorbers 20a and 20b which serve for separate recovery of krypton and xenon. Waste gas is admitted by way of a supply conduit 6 and a valve 21 which connects the conduit 6 with a conduit 22 (corresponding to the conduit 3 of FIG. 1) or with the conduit 6'. The stream of waste gas flows through the relatively small upper adsorber 20a and enters the relatively large lower adsorber 20b by way of a valve 26. The dimensions of the adsorbers 20a and 20b are selected in such a way that no xenon will escape as yet at the outlet of the adsorber 20a when the outlet of the adsorber 20b already discharges krypton. The gas which has been relieved of krypton and xenon is discharged into the atmosphere by way of a conduit 24 which is connected with the outlet of the adsorber 20b and contains a valve 23. When krypton begins to escape at the outlet of the adsorber 20b, activated carbon in the adsorbers 20a and 20b is regenerated while the valve 21 conveys waste gas from the conduit 6 into the conduit 6' for admission into additional adsorbers (not shown) which are connected in parallel with the adsorbers 20a and 20b.

The regeneration of activated carbon in the adsorbers 20a and 20b takes place in the following way:

The valve 23 seals the discharge conduit 24 from the outlet of the adsorber 20b and simultaneously seals this outlet from a conduit 37 which contains a pump 33 and is connected with the condenser 34b of a combined evaporating and condensing aggregate 34. The operator opens a valve 25 which is installed in a conduit 28, together with a further valve 30 and an intermediate receptacle 29, so that a pump 27 in the conduit 28 can evacuate waste gas from the adsorbers 20a, 20b and reduce the pressure in these adsorbers to 10–300 torr. The evacuated gas, whose average krypton and xenon content approximates that of waste gas in the supply conduit 6, is fed into the conduit 6' for introduction into the additional adsorbers.

The valve 25 is thereupon closed and the operator adjusts the valves 23, 31 and 32 in such a way that the aforementioned pump 33 in the conduit 37 can supply a cleansing or rinsing gas (e.g., $CO_2$ gas) from the evaporator 34a into the upper end of the smaller adsorber 20a. The cleansing gas is supplied at a pressure of 10–400 torr and flows from the evaporator 34a via conduits 35, 36, valves 31, 32, 26, adsorbers 20a, 20b, valve 23, conduit 37, and pump 33 into the condenser 34b of the aggregate 34. The cleansing gas desorbs krypton and xenon in the adsorbers 20a, 20b and is thereupon frozen in the condenser 34b. The product gas (krypton and xenon) is evacuated by way of a conduit 43.

The valve 26 closes after a short interval of desorption (about 2–3 minutes after the conduits 35, 36 begin to admit $CO_2$ gas). Such interval suffices to insure practically complete transfer of krypton from the adsorber 20a into the adsorber 20b by way of the valve 26, whereas xenon remains in the adsorber 20a. The valves 31, 32 and 38 of the apparatus shown in FIG. 2 are thereupon adjusted to allow for separate regeneration of activated carbon in the adsorbers 20a and 20b. The rinsing or cleansing gas for activated carbon in the adsorber 20b is furnished by the pump 33 by way of the conduit 35, valve 31 and conduit 35a. The cleansing gas (e.g., $CO_2$ gas) for the adsorber 20a is furnished by a further pump 40 which is installed in a conduit 42 connecting an outlet of the adsorber 20a with the condenser 39b of an evaporation-condensation aggregate 39. The cleansing gas flows from the evaporator 39a of the aggregate 39, through a conduit 41, valve 32, adsorber 20a, valve 38 and pump 40 in the conduit 42, and into the condenser 39b. The valve 32 seals the conduit 41 from the conduit 36 and connects the conduit 41 with the adsorber 20a. The cleansing gas is frozen in the condensers 34b, 39b and the product gas (krypton in aggregate 34 and xenon in aggregate 39) is respectively evacuated by way of conduits 43, 44. A valve 45 is provided to supply metered quantities of fresh cleansing gas to the evaporator 34a when necessary. A similar valve 46 can be actuated to admit metered quantities of fresh cleansing gas to the evaporator 39a.

When the desorption of krypton and xenon from activated carbon is completed, the circulation of cleansing gases is interrupted by appropriate adjustment of the valves 23, 31 and 32. In the next step, the operator (or a programming system) opens the valves 47 and 48 for admission into the respective adsorbers 20a, 20b of a gas which is preferably identical with the main constituent (e.g., air) of waste gas in the supply conduit 6 so as to raise the pressure in the two adsorbers to normal operating pressure. The regeneration of activated carbon is now completed and the adsorbers 20a and 20b can be connected to the supply conduit 6 in response to appropriate adjustment of the valves 21, 26 and 23. Thus, the valve 21 connects the supply conduit 6 with the conduit 22, the valve 26 is opened, and the valve 23 connects the outlet of the adsorber 20b with the discharge conduit 24.

EXAMPLE 1

The adsorber 1 of FIG. 1 was filled with activated carbon and was maintained at a pressure of 760 torr during admission of waste gas at a temperature of 21° C. The waste gas contained air and radioactive krypton-85 in a concentration of 1.2 microcuries per milliliter. The waste gas was admitted at the speed of 100 cm/min. Escape of krypton-85 at the outlet of the adsorber 1 was detected after an interval of 18 minutes at the rate of 1.2 $\times$ $10^{-4}$ microcurie per milliliter i.e., a factor $10^{-4}$ of the concentration in the inflowing waste gas. The waste gas was thereupon admitted into the conduit 6' and the adsorber 1 was regenerated as follows:

In the first step, a vacuum pump (see the pump 9 of FIG. 1) was operated to evacuate gases from the adsorber 1 countercurrent to the inflow of waste gas (i.e., upwardly, as viewed in FIG. 1) so that the pressure in the adsorber 1 was reduced to 30 torr. The evacuation was completed within one minute. The thus desorbed gas, whose average concentration of krypton-85 was 1.2 microcuries for milliliter, and whose volume corresponded to or approximated five times the adsorption volume, was stored in the intermediate receptacle 12 for admission at a controlled rate into the stream of waste gas in the conduit 3 upon renewed admission of waste gas into the adsorber 1.

The vacuum pump was left running and the valve 19 was opened to admit into the activated carbon bed atmospheric air by way of a suitable flow restrictor so that the pressure in the adsorber 1 rose to 50 torr. The gas which was circulated by the vacuum pump was collected in a gasometer for a period of 35 minutes. The volume of such gas corresponded to or equaled five times the adsorption volume. The concentration of krypton-85 in the gasometer was 3.1 times higher than the concentration of krypton in the waste gas (conduit 6), i.e., the enrichment or concentration factor was 3.1. After stoppage of the pump, the pressure in the adsorber 1 was raised to 760 torr and the valve 2 was adjusted to supply waste gas from the supply conduit 6 into the activated carbon by way of the conduit 3.

EXAMPLE 2

The separation of krypton-85 was carried under the circumstances described in the Example 1. However, the adsorber 1 was heated to 120° C. subsequent to adsorption and prior to cleansing. The heating step was followed by cleansing or rinsing with steam at 120° C. and at a pressure of 150 torr for a period of 8 minutes. The steam was completely condensed downstream of the adsorber and the remaining desorption gas contained krypton-85 in a concentration fifteen times the concentration of krypton-85 in waste gas (enrichment factor 15). Prior to renewed admission of waste gas, the adsorber was rinsed with cool air so that its pressure rose to 760 torr and its temperature dropped to 21° C.

EXAMPLE 3

The adsorber 1 of FIG. 1 was connected with a source of waste gas containing air at 21° C. and 42 microcuries per milliliter of krypton-85. Waste gas was conveyed at a speed of 90 cm/min. After a period of 20 minutes, krypton gas began to escape at a concentration $10^{-4}$ times the initial concentration. The waste gas was thereupon fed to a further adsorber (see the conduit 6' in FIG. 1). The first adsorber was regenerated as follows:

In the first step, the adsorber was evacuated for one minute in the same manner as described in the Example 1 and the desorption gas whose average krypton concentration corresponded to that of krypton gas in the inflowing waste gas (42 microcuries per milliliter) was stored in an intermediate receptacle. The adsorber was thereupon cleansed or rinsed in a manner different from that described in Example 1. Thus, a supply of desorption gas was stored in a suitable vessel and one-half of the thus stored gas was used for rinsing of the adsorber for a period of 19 minutes and at a pressure of 50 torr. The concentration of the thus obtained product fraction exceeded that in the waste gas by a factor of 5.2 and the volume of this fraction was 2.5 times the reactor volume. The adsorber was thereupon cleansed with air under identical circumstances for a period of 20 minutes. The thus obtained gas, whose volume corresponded to 2.7 times the reactor volume and whose concentration approximated that of krypton in the waste gas (42 microcuries per milliliter) was fed into an intermediate container for introduction at a controlled rate into waste gas upon resumption of admission of waste gas into the adsorber. The pump was thereupon arrested and the pressure in the adsorber was raised to 760 torr in the same way as described in Example 1.

EXAMPLE 4

Two adsorbers 20a, 20b were connected in series in a manner as shown in FIG. 2. The volume of the larger adsorber 20b was 14 times the volume of the smaller adsorber 20a. The waste gas which was admitted from the conduit 6 was maintained at $-5°$ C. and at a pressure of 760 torr. The waste gas contained air, krypton-85 in a concentration of 1.2 microcuries per milliliter and xenon-133 in a concentration of 33 microcuries per milliliter. The waste gas was conveyed at a speed of 143 cm/min. Krypton-85 started to escape from the larger adsorber 20b after a period of 27 minutes (in a concentration $10^{-4}$ times the initial concentration). The flow of fresh waste gas to the adsorbers 20a, 20b was interrupted and fresh waste gas was thereupon admitted to one or more additional groups of series-connected adsorbers by way of the conduit 6'.

The adsorbers 20a, 20b were thereupon evacuated so that the pressure therein decreased to 10 torr (after an interval of 3 minutes). The thus obtained desorption gas was collected in an intermediate receptacle for admission, in metered quantities, into waste gas during renewed introduction of waste gas into the adsorbers 20a and 20b.

In the next step, the adsorbers 20a, 20b were rinsed with $CO_2$ gas at a temperature of $-5°$ C. and at a pressure of 30 torr. The direction of flow of $CO_2$ gas through the adsorbers was the same as the direction of flow of waste gas. The $CO_2$ gas was frozen in a deep cooling trap downstream of the second adsorber 20b so that the remaining gaseous component consisted only of krypton-85 and xenon-133.

After a cleansing period of 3 minutes, the valve 26 between the adsorbers 20a, 20b was closed and the two adsorbers were thereupon cleansed separately under the same circumstances as described above. This resulted in recovery of krypton-85 from frozen $CO_2$ gas (conduit 43) and in recovery of xenon-133 from frozen $CO_2$ gas (conduit 44). The fluid issuing from the conduits 43 and 44 further contained air. The enrichment factor for krypton was 37 and such factor was 530 for xenon.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended.

1. A method of recovering nuclides from waste gases, comprising the steps of conveying a stream of waste gas which includes krypton and xenon nuclides through adsorbing means containing a bed of adsorbent which is at a predetermined pressure so as to adsorb nuclides from said waste gas, said waste gas also including a carrier gas component constituting the major portion thereof and being conveyed through said bed in a predetermined direction; interrupting said conveying step when the concentration of krypton nuclides in the gas escaping from said bed reaches substantially a predetermined value; reducing the pressure in said bed to between approximately 10 and 300 torr so as to partially evacuate said bed and obtain a desorption gas, said pressure-reducing step being carried out in such a manner that evacuation of said desorption gas from said bed occurs concurrent with the flow of said waste gas; rinsing said bed with rinsing fluid so as to desorb nuclides from said bed and obtain product fluid enriched in nuclides, said rinsing step being initiated before the concentration of krypton nuclides in said desorption was substantially exceeds the concentration of krypton nuclides in said waste gas, and said rinsing fluid being conveyed through said bed countercurrent to the flow of said waste gas and at pressures between approximately 10 and 400 torr; raising the pressure in said bed to substantially said predetermined pressure prior to repeating said conveying step by introducing into said bed a gaseous substance having a composition substantially the same as that of said carrier gas component and which is substantially free of nuclides; and admitting at least a portion of said desorption gas into an adsorbent for the adsorption of nuclides therefrom.

2. A method for the purging of waste gas and recovery of krypton and/or xenon nuclides therefrom, the method comprising the following steps in the following sequence:
    a. passing the waste gas through an adsorbent in an adsorber at a preselected pressure and discharging the purged gas until the nuclides are no longer adsorbed to a substantial extent and traces of the nuclides appear in the effluent gas,
    b. thereafter stopping the passage of the waste gas through the adsorber,
    c. withdrawing gas from the adsorber by subjecting the latter to a partial vacuum,
    d. terminating the withdrawing step $c$ when the concentration of nuclides in the gas withdrawn from the adsorber substantially approximates the concentration of nuclides in the waste gas,
    e. thereafter recovering the adsorbed nuclides from the adsorber by passing an inert rinsing fluid through the adsorber at a pressure lower than the original preselected pressure and (a) in countercurrent to or (b) concurrent with the normal flow of the waste gas through the adsorbent in the adsorber, whereby in case (a) a nuclide-enriched gas is obtained from which one of the nuclides or a mixture of both nuclides is recovered, or whereby in case (b) each of the nuclides is recovered separately from successive amounts of rinsing gas for separating the nuclides from the rinsing gas
    f. passing a gas which is substantially of the same composition as said waste gas except that it is free of nuclides into the adsorber to restore the pressure in the adsorber to the original preselected pressure at which the waste gas is normally passed through the adsorber, and
    g. recycling the gas withdrawn in step $b$ together with fresh quantities of waste gas.

3. A method as defined in claim 2, said rinsing step comprising rinsing during a first stage so as to obtain a first product gas fraction which contains nuclides in a concentration exceeding the concentration of nuclides in said waste gas, and thereafter rinsing said bed with an inert gas in a second stage so as to obtain a second product gas fraction wherein the average concentration of nuclides approximately equals the concentration of nuclides in said waste gas; and further comprising the step of admitting at least a portion of said second product gas fraction into an adsorbent for the adsorption of nuclides therefrom.

4. A method as defined in claim 3, wherein the rinsing during said first stage is effected with a gaseous substance which comprises a gas selected from the group consisting of said desorption gas and untreated waste gas.

5. A method as defined in claim 2, wherein said rinsing fluid comprises a readily condensable gas selected from the group consisting of freon, carbon dioxide, ammonia and steam; and further comprising the step of at least partially removing said rinsing fluid from said product fluid by freezing or condensation.

6. A method as defined in claim 2, wherein said rinsing fluid comprises a readily condensable gas selected from the group consisting of freon, carbon dioxide, ammonia and steam; and further comprising the step of at least partially removing rinsing fluid from the product gas by freezing or condensation.

7. A method as defined in claim 2 in which the absolute pressure during the withdrawing step $c$ is maintained between 10 and 300 torr and the absolute pressure during the rinsing step $e$ is maintained between 10 and 400 torr.

8. A method as defined in claim 2 in which the absolute pressure during the withdrawing step $c$ is maintained between 20 and 120 torr.

9. A method as defined in claim 2 in which the absolute pressure during the rinsing step $e$ is maintained between 30 and 150 torr.

10. A method as defined in claim 2 in which an inert rinsing gas is passed through the adsorbent in the adsorber in the rinsing step $e$ concurrently to the normal flow of the waste gas therethrough, and each of the nuclides is recovered in separate fractions.

11. A method as defined in claim 10 in which first a fraction is recovered containing krypton which fraction is substantially free of xenon and in which a second fraction is recovered thereafter containing xenon which second fraction is substantially free of krypton.

12. A method as defined in claim 2 in which the adsorber consists of two sections the volumes of which are related to each other in such a manner that Krypton nuclides issue from the second of the two sections during the adsorption step *a* before xenon nuclides issue from the first of the two sections.

13. A method as defined in claim 12 in which a stream of an inert rinsing gas in the rinsing step *e* is passed successively through the first and second sections of the adsorber to effect a substantially complete desorption of krypton from the first section, and thereafter separate streams of inert rinsing gas are passed through each of the first and second sections of the adsorber to obtain a first fraction that contains krypton and is essentially free of xenon from the first section and a second fraction that contains xenon and is essentially free of krypton from the second section of the adsorber.

14. A method as defined in claim 2 in which the inert rinsing fluid is carbon dioxide, ammonia, steam, or a Freon.

15. A method as defined in claim 2 in which the adsorbent is activated carbon.

16. A method as defined in claim 2 in which the adsorber is at substantially atmospheric pressure upon initiation of the adsorption step *a*.

17. A method as defined in claim 2 in which gas is eluted from the adsorber during substantially the entire duration of the rinsing step *c* and the latter is the sole rinsing step used in the said method.

18. A method as defined in claim 2 in which the carrier gas is air.

* * * * *